(12) United States Patent
Shah et al.

(10) Patent No.: US 11,444,983 B2
(45) Date of Patent: Sep. 13, 2022

(54) ADAPTIVE COMMUNICATION ALERTS

(71) Applicant: Avaya Management L.P., Santa Clara, CA (US)

(72) Inventors: Shamik Shah, Pune (IN); Prasanta Kumar Jena, Pune (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/885,043

(22) Filed: May 27, 2020

(65) Prior Publication Data
US 2021/0377319 A1    Dec. 2, 2021

(51) Int. Cl.
*H04L 65/1069* (2022.01)
*H04L 65/10* (2022.01)
*H04L 51/42* (2022.01)
*H04L 65/80* (2022.01)
*H04L 51/046* (2022.01)
*H04L 65/1016* (2022.01)

(52) U.S. Cl.
CPC ........ *H04L 65/1069* (2013.01); *H04L 51/046* (2013.01); *H04L 51/22* (2013.01); *H04L 65/1006* (2013.01); *H04L 65/1016* (2013.01); *H04L 65/80* (2013.01)

(58) Field of Classification Search
CPC ............. H04L 65/1069; H04L 65/1006; H04L 65/1016; H04L 51/046; H04L 51/22
USPC ........................................................ 370/352
See application file for complete search history.

(56) References Cited

U.S. PATENT DOCUMENTS

| | | | | |
|---|---|---|---|---|
| 6,246,752 | B1* | 6/2001 | Bscheider | G11B 31/00 379/111 |
| 2006/0256949 | A1* | 11/2006 | Noble, Jr. | H04M 3/5231 379/265.01 |
| 2010/0304719 | A1* | 12/2010 | Deep | H04M 3/42374 455/413 |
| 2012/0008759 | A1* | 1/2012 | Mcfeeters | H04N 1/33307 379/213.01 |
| 2015/0181397 | A1* | 6/2015 | Dudai | H04M 3/4211 455/405 |

OTHER PUBLICATIONS

Whitson Gordon, Change how long your phone rings before sending calls to voicemail, lifehacker, lifehacker.com, https://lifehacker.com/change-how-long-your-phone-rings-before-sending-calls-t-5878635 (Year: 2012).*

Garry Pearson, A simple technique to improve your outbound dialler, Oct. 23, 2013, callcentrehelper.com, https://www.callcentrehelper.com/a-simple-technique-to-improve-your-outbound-dialler-47343.htm (Year: 2013).*

* cited by examiner

*Primary Examiner* — Zi Ye

(57) ABSTRACT

The technology disclosed herein enables the use of adaptive durations when alerting users about communication session requests. In a particular embodiment, a method provides identifying a first request to establish a first communication session with a first endpoint and determining a first duration for alerting a first user of the first endpoint about the first request based on information about the first request. The method further provides alerting the first user about the first request in accordance with the first duration.

20 Claims, 8 Drawing Sheets

ADAPTIVE COMMUNICATION ALERTS

TECHNICAL BACKGROUND

When a communication request, such as an incoming call request, is received at an endpoint, the endpoint will alert its user to notify the user about the incoming call request. For example, the endpoint may be a telephone operated by the user and the alert may be an audible ringtone, vibration, visual display, and/or some other type of indication to the user that the telephone received a communication request to which the user can respond (e.g., answer). Typically, absent intervention on either side of the communication request (e.g., either party canceling the request or the called party answering the request), the communication request will remain open for response from the called party indefinitely or, in some cases, a fixed length of time before the communication request is directed elsewhere (e.g., directed to voicemail). Especially in situations where many communication requests are being placed (e.g., from an outgoing contact center), the more time spent waiting for responses to communication requests ties up resources that could be used elsewhere (e.g., used to place communication requests that will be answered).

SUMMARY

The technology disclosed herein enables the use of adaptive durations when alerting users about communication session requests. In a particular embodiment, a method provides identifying a first request to establish a first communication session with a first endpoint and determining a first duration for alerting a first user of the first endpoint about the first request based on information about the first request. The method further provides alerting the first user about the first request in accordance with the first duration.

In some embodiments, alerting the first user includes alerting the first user until the first duration has elapsed starting from when alerting the first user began and, after alerting the first user, canceling the first request.

In some embodiments, determining the first duration includes feeding at least a portion of the information about the first request into a duration-determination algorithm comprising a machine learning algorithm trained using information about past requests to establish communication sessions and respective outcomes of the past requests. In those embodiments, the method may include receiving a response to the first request from the first user and training the duration-determination algorithm using the response. In those embodiments, determining the first duration may also include adjusting a value for the first duration that is output by the duration-determination algorithm based on a second portion of the information about the first request that is associated with the first user. The method in those embodiments may also include receiving a response to the first request from the first user and updating the second portion of the information based on the response.

In some embodiments, determining the first duration includes assigning a value to the first duration that inversely relates to a likelihood that the first user will respond to the first request.

In some embodiments, the information about the first request includes one or more of a group comprising called-party information about the first user, calling-system information, a first time at which the first request is identified, one or more past durations for alerting the first user about requests to establish communication sessions, a device type of the first endpoint, and status information about the first user from one or more third-party channels.

In some embodiments, the first duration includes either an amount of time or a number of discrete alert events.

In some embodiments, the method includes identifying a second request to establish a second communication session with a second endpoint and determining a second duration for alerting a second user of the second endpoint about the second request based on information about the second request, wherein the second duration is different than the first duration. The method in those embodiments also includes alerting the second user about the second request in accordance with the second duration.

In another embodiment, apparatus is provided having one or more computer readable storage media and a processing system operatively coupled with the one or more computer readable storage media. Program instructions stored on the one or more computer readable storage media, when read and executed by the processing system, direct the processing system to identify a first request to establish a first communication session with a first endpoint and determine a first duration for alerting a first user of the first endpoint about the first request based on information about the first request. The program instructions further direct the processing system to alert the first user about the first request in accordance with the first duration.

DETAILED DESCRIPTION

Determining how long it will likely take for a called party to respond to an incoming communication request, and/or if that called party will respond at all, allows the systems herein to adjust a duration for alerting a called party about a communication request. Adjusting the duration of the alert about a communication request, allows a calling party/system to move on from the communication request after a tailored amount of time has passed rather than, for example, a calling system waiting a predefined default amount of time (e.g., 30 seconds) or until the calling party chooses to cancel the communication request. In general, tailoring the alert duration to the communication request is based upon information that indicates how long it will take a called party to answer (i.e., accept) an incoming communication request or whether the called party will answer at all. For instance, if the called party is likely to answer a communication request, then the duration of the alert may be longer than it otherwise could have been so as to ensure the called party has enough time to answer. However, if the called party is not likely to answer the communication request, then the duration of the alert may be shorter so as to allow the calling party or calling system to move on to other tasks sooner in the event that the called party does not answer, as anticipated. In other words, there is, generally, an inverse relationship between the likelihood that the called party will answer a call and the duration for alerting the called party about a call. Therefore, the technology described below is able to strike a balance between giving a called party the opportunity to answer an incoming communication and not alerting the called party for an undue duration.

Figure 1:
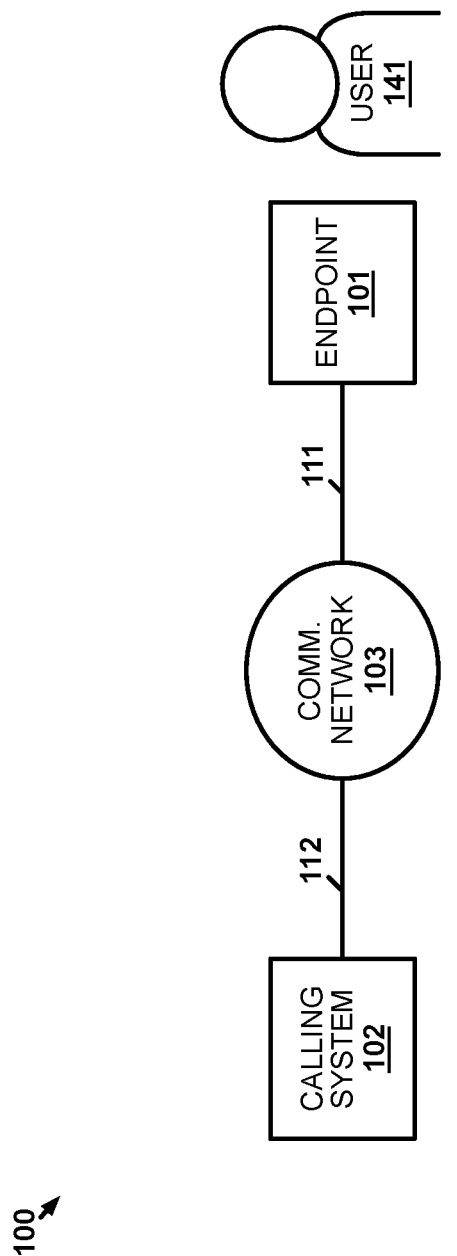
FIG. 1 illustrates an implementation for adaptively alerting about a communication request.

FIG. 1 illustrates implementation 100 for adaptively alerting about a communication request. Implementation 100 includes endpoint 101, calling system 102, and communication network 103. Endpoint 101 and communication network 103 communicate over communication link 111. Calling system 102 and communication network 103 communicate over communication link 112. Communication links 112-114 may comprise wireless and/or wired communication links and may include intervening communication networks, systems, and devices. Communication network 103 may include one or more local area networks and/or wide area networks, including the Internet. Communication network 103 may include one or more packet-based networks and/or circuit switched networks.

Endpoint 101 is computing system operated by user 141 that includes processing circuitry, communication circuitry, and a user interface that enables endpoint 101 to perform as described below. Endpoint 101 may be a telephone, laptop, personal computer, tablet computer, or some other type of user operable computing device. Calling system 102 also includes processing circuitry, communication circuitry, and, optionally, a user interface that enables calling system 102 to perform as described below. Calling system 102 may be a computing system similar to endpoint 101 that is operated by a user or may be a different type of computing system, such as an automatic dialer system or an automated response system.

In operation, when a system, such as calling system 102, requests a communication session with endpoint 101, endpoint 101 alerts user 141 about the incoming communication session request. For example, upon receiving the session request, the user interface of endpoint 101 alerts user 141 about the communication session request. The alert may be audible (e.g., a ring tone), tactile (e.g., vibration), visual (e.g., a display screen notification, light emitting diode, etc.), or some other user interface actuation that would indicate to user 141 that a communication session request has been received—including combinations thereof. The alert is not allowed to continue beyond a determined alert duration, as described below. Thus, absent another action being taken with respect to the alert, such as user 141 responding to the alert (e.g., answers or sends the communication session request to voicemail) or a user of calling system 102 (if calling system 102 has a user) canceling the communication request, before the alert duration elapses, the alert will end upon elapsing of the alert duration.

Figure 2:
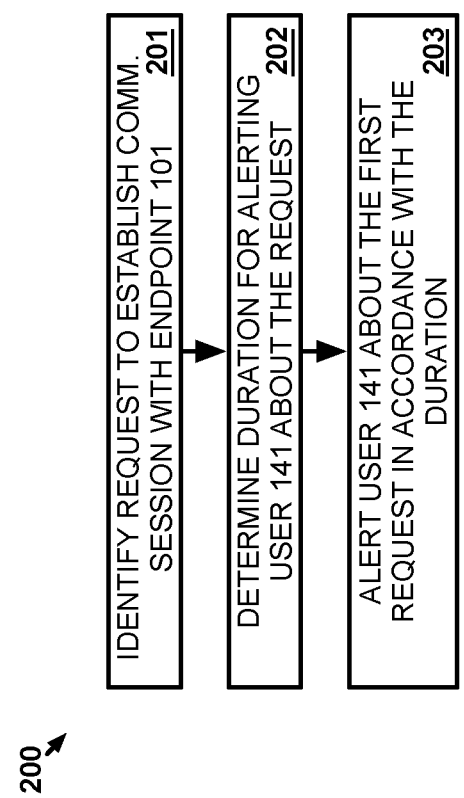
FIG. 2 illustrates an operational scenario to adaptively alert about a communication request.

FIG. 2 illustrates operational scenario 200 to adaptively alert about a communication request. The steps in operational scenario 200 may be performed by any of endpoint 101, calling system 102, or communication network 103. As such, adapting the alert duration may be accomplished at either end of a communication session request between two systems (i.e., at calling system 102 or endpoint 101) or at a system in between (i.e., in communication network 103).

In operational scenario 200, a request to establish a communication session with endpoint 101 is identified (201). The communication session may be a session for exchanging voice, video, text, or some other type of user communications for user 341—including combinations thereof. In some examples, the request may be a request from a user or an application executing on calling system 102 or may be a request that is generated by calling system 102 to initiate the communication session with endpoint 101. For example, a user of calling system 102 or a software application executing on calling system 102 may indicate that a communication session with user 141 is desired (e.g., by dialing a phone number associated with endpoint 101). The request may also comprise signaling for a circuit switched telephone network, such as plain old telephone service (POTS) signaling, or may comprise signaling for packet network based communication service, such as Voice over Internet Protocol (VoIP) or another type of packet based service using Session Initiation Protocol (SIP), Web Real Time Communications (WebRTC), or some other communication protocol, that indicates to endpoint 101 that a communication session is being requested by calling system 102. Depending on the networks involved in communication network 103, the request may be converted to other types of signaling or other protocols before arriving at endpoint 101 (e.g., calling system 102 may use VoIP and endpoint 101 may be a POTS telephone). The request may be identified when the request is received.

A duration for alerting user 141 about the request is determined based on information about the request (202). The duration may be measured in time (e.g., seconds), number of discrete alert events (e.g., ring tone instances, vibrate instances, light flashes, etc.), or some other unit of measurement for a duration. The information includes any type of information that may indicate a likelihood that user 141 will answer the request and/or how long it will take for user to answer. The information may include called-party information about the first user (e.g., gender, age, geographic location, call answer history, personal preferences, etc.), calling-system information about calling system 102 (e.g., a phone number used to identify calling system 102 for the request), a time at which the request is identified with respect to endpoint 101 (i.e., time of day, day of year, season, whether the day may be a holiday for user 141, etc.), past durations determined for alerting user 141, or other users (preferably similar users), about past requests to establish communication sessions, actual answering times for past alerts, a device type of endpoint 101 (e.g., landline phone, cellular phone, computer, etc.), status information about user 141 from one or more third-party channels (e.g., social media posts associated with user 141, presence information about user 141, etc.), or some other type of information that may be relevant to determining the duration. The information may be collected from other systems, such as database systems, social network systems, customer information systems, or other type of system capable of providing information.

Each item of information, or combination of items, may be associated with an amount of time that the duration should be adjusted (i.e., lowered or raised) to result in the determined alert duration for the first request. For example, the duration determination may begin with an initial value (e.g., 20 seconds) that is then lowered by an amount when an item of information, or combination of items, indicates that user 141 is less likely to answer the request. The amount of time for a given item or combination may be fixed or may be dependent on a weight of the information (e.g., within other values for the information or relative to other items/combination) and/or a confidence that the information is correct. For example, ages for users in a given range may reduce the duration but different ages in that range may trigger the duration to be reduced more than others. Also, there may be a minimum and/or maximum limit on the values that the determined duration can take (e.g., the duration must be between 5 seconds and 30 seconds). In some examples, the initial value mentioned above may be a default starting value or may be a value that was previously determined for a previous communication request to user 141. For instance, if 15 seconds was the duration determined the last time a communication session was requested with user 141, then 15 seconds is the initial value used when determining the duration for the next communication session request with user 141.

In some examples, a duration-determination algorithm may be generated using machine learning. The duration-determination algorithm is trained by providing information about past requests and indicating the outcome of each respective request (e.g., whether the called user answered and how long the called user took to answer). After being trained, the duration-determination algorithm is fed the information about the present request and outputs the duration for alerting user 141. In some examples, the output of the duration-determination algorithm may be further adjusted based on information specific to user 141. For instance, despite the duration-determination algorithm determining a particular value for the duration, information specific to user 141 may indicate that user 141 usually takes longer than other users under similar circumstances to answer. Thus, in that example, the duration is increased an amount consistent with user 141's past performance.

The duration may be determined fully within the system that identified the request (i.e., endpoint 101, calling system 102, or communication network 103) or that system may collaborate with other systems, including systems not shown in implementation 100, to determine the duration. In one example, the duration determination may be made by querying another system for the duration. The query would include information about the request for the other system to use when determining the value for the duration.

User 141 is alerted about the request in accordance with the determined duration (203). In examples where endpoint 101 controls the duration of the alert, user 141 is alerted until the duration has elapsed starting from when endpoint 101 began alerting user 141. For example, endpoint 101 may ring, vibrate, and/or display an onscreen communication alert to notify user 141 that the communication session request has been received. If user 141 does not answer the request or perform some other action (e.g., reject the request or send the request to voicemail) before the duration elapses, then endpoint 101 stops alerting user 141 upon the duration elapsing. Endpoint 101 may then reject the request (e.g., hang up on the request, send a request rejection message, send the request to voicemail, etc.).

In examples where calling system 102 controls the duration of the alert, calling system 102 allows the request to remain open (e.g., does not hang up or otherwise cancel the request) until the duration has elapsed. Essentially, the calling system 102 alerts user 141 by assuming that endpoint 101 will generate the actual alert for user 141 upon receiving the request. When calling system 102 cancels the request, then endpoint 101 is assumed to also stop generating alerts for user 141. In these examples, elapsing of the duration may be measured from when the request was transferred, from when a confirmation is received that endpoint 101 received the alert, or from some other time indicative that endpoint 101 will begin alerting user 141. Similarly, if communication network 103 controls the duration of the alert, then communication network 103 will allow the request to ramen open until the duration has elapsed from a time indicative that endpoint 101 will begin alerting user 141. When the duration elapses, communication network 103 may itself disconnect or otherwise reject the call request (e.g., notify calling system 102 of the rejection or send the request to voicemail), which is assumed to cause endpoint 101 to stop generating alerts for user 141. In the above examples, since endpoint 101 is assumed to be generating alerts for user 141 while the request remains open, it should be understood that calling system 102 and communication network 103 are considered to be alerting user 141 even if endpoint 101 fails to actually generate alerts (as may be the case if, for example, endpoint 101 is set by user 141 to "do not disturb").

Advantageously, operational scenario 200 allows the alerting of user 141 to continue for a duration that is tailored to a specific request based on the information about the request. Adjusting the duration on a per-request basis, increases the chances that user 141 will have enough time to answer in situations where they are more likely to answer while decreasing the amount of time calling system 102 spends waiting while user 141 is alerted about the request in situations where they are less likely to answer. That allows calling system 102, or its user, to make more efficient use of resources (e.g., time, communication channels, processing resources, etc.).

In some examples, user 141 not answering after a threshold number of communication attempts may lead to a default value being determined for the duration. For instance, each time user 141 does not answer, it may cause the subsequent duration determination to have a lower value than the previously determined value for the preceding communication request. After a threshold number of attempts has been reached (e.g., 5 attempts), the duration is automatically determined to be the default value that is higher than would otherwise be determined. There may be one universal default or individual defaults associated with respective called party groups (e.g., different defaults for called parties in different age groups). In similar examples, after decreasing the duration for a threshold number of communication attempts where user 141 does not answer, the duration may be increased gradually for subsequent attempts until user 141 actually answers rather than being increased directly to a default value.

In additional examples, a user may be given privileges themselves to reset or override the durations. For example, calling system 102 may be located in a contact center and an administrator at the contact center may determine that users in a particular group are not answering as often as the administrator would expect (e.g., users located in a particular country). The administrator may then instruct calling system 102 to reset the next determined duration for users in that particular group to a default value or a value otherwise provided by the administrator.

Figure 3:
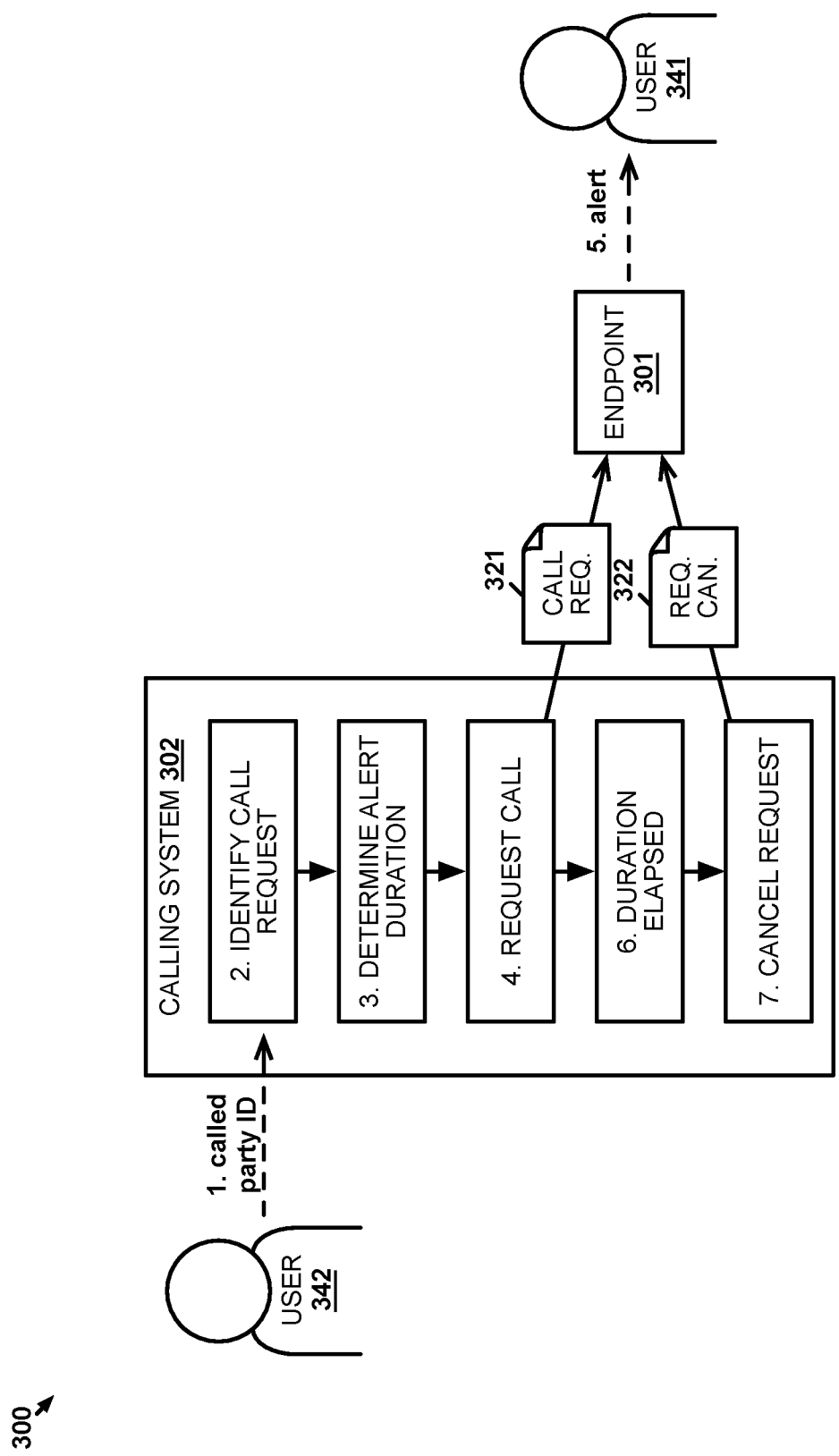
FIG. 3 illustrates another operational scenario to adaptively alert about a communication request.

FIG. 3 illustrates operational scenario 300 to adaptively alert about a communication request. In operational scenario 300, endpoint 301 is an example of endpoint 101 and calling system 302 is an example of calling system 102. Calling system 302 in this example is an endpoint operated by user 342 while endpoint 301 is operated by user 341. User 342 indicates to calling system 302 that they want calling system 302 to establish a communication session with user 341 by providing a called party identifier that identifies user 341 to calling system 302 at step 1. The communication session in this case is a voice or video call to exchange user communications between user 342 and user 341. The called party identifier may be a phone number, or other identifier, associated with endpoint 301 (and thereby associated with user 341 based on user 341 operating endpoint 301), a user handle associated with user 341 (e.g., user 341's username for a particular communication service), or some other identifier that enables calling system 302 to direct a call request to endpoint 301. The called party identifier may be input by user 342 explicitly or may be selected from contacts list, webpage, or by some other method of selecting information on a user system. In some examples, calling system 302 executes an application (e.g., a communication client) that directs calling system 302 to perform as described in operational scenario 300.

Based on receiving the called party identifier, calling system 302 identifies that user 342 is requesting a call with user 341 at step 2. User 342 may provide additional input, such as pressing a call button, that initiates the call request process after indicating the called party identifier. Calling system 302 determines how long user 341 should be alerted about the call request at step 3. As discussed above, the duration is determined from information about the call request. For instance, the duration may be determined based on the age, gender, location, shopping history, social media postings, etc. of user 341. Likewise, the duration may also be determined based on the current time at endpoint 301's location, the calling party identifier for calling system 302, a device type for endpoint 301, a type of call being requested (e.g., voice or video), user activity information, or other relevant information, from communication network 103 (e.g., from a service provider of endpoint 301), or some other type information concerning the context of the request. In an example, calling system 302 may determine that user 341 is within a first age group and that members of that first age group are more likely to answer call requests at the current time of day than members of other age groups. That determination may cause calling system 302 to increase the duration by a given amount that is associated with the age group vs. time of day determination (e.g., 10 seconds).

Calling system 302 also requests the call by transferring call request 321 at step 4 to endpoint 301. From the time calling system 302 transfers call request 321 (or in response to endpoint 301 acknowledging the receipt of call request 321 or some other indication that calling system 302 may use to assume endpoint 301 is aware of call request 321 to alert user 341), calling system 302 determines whether the determined duration has elapsed. Upon receiving call request 321, endpoint 301 generates an alert to user 341 at step 5 indicating that the call request 321 has been received. Endpoint 301 may ring, vibrate, and/or display to alert user 341 about call request 321. Even if endpoint 301 does not actually generate an alert to user 341 (e.g., is in a do-not-disturb mode), calling system 302 considers its transfer of call request 321 to be alerting user 341. Therefore, calling system 302 measures the duration of its alerting from the time call request 321 is sent or receipt is confirmed by endpoint 301.

In this example, user 341 does not answer or otherwise response to call request 321 before the duration elapses. Thus, when calling system 302 determines that the duration has elapsed at step 6, calling system 302 cancels call request 321 at step 7 by sending request cancelation 322 to endpoint 301. In other examples, an explicit cancelation message may not be required. For instance, a circuit switched call may simply allow calling system 302 to hang up to break the circuit. After receiving request cancelation 322, endpoint 301 can no longer enable user 341 to answer call request 321 because call request 321 is no longer available for response. Thus, from the perspective of calling system 302, calling system 302 is no longer alerting user 341 about the call and can use call resources (e.g., lines, processing power, etc.) for other tasks (e.g., user 342 may wish to call someone else).

Call request 321 is transferred only to endpoint 301 in operational scenario 300, although, it should be understood that multiple endpoints may receive call requests in other examples. For example, user 341 may log into multiple endpoints with credentials associated with the called party identifier. Each of those endpoints may receive a call request, either transferred directly from calling system 302 or in response to a service provider system receiving call request 321. In those examples, the duration would apply to whether user 341 answers the call request at any of those endpoints. If the duration elapses, then the cancellation of call request 321 would apply to all endpoints associated with user 341.

Figure 4:
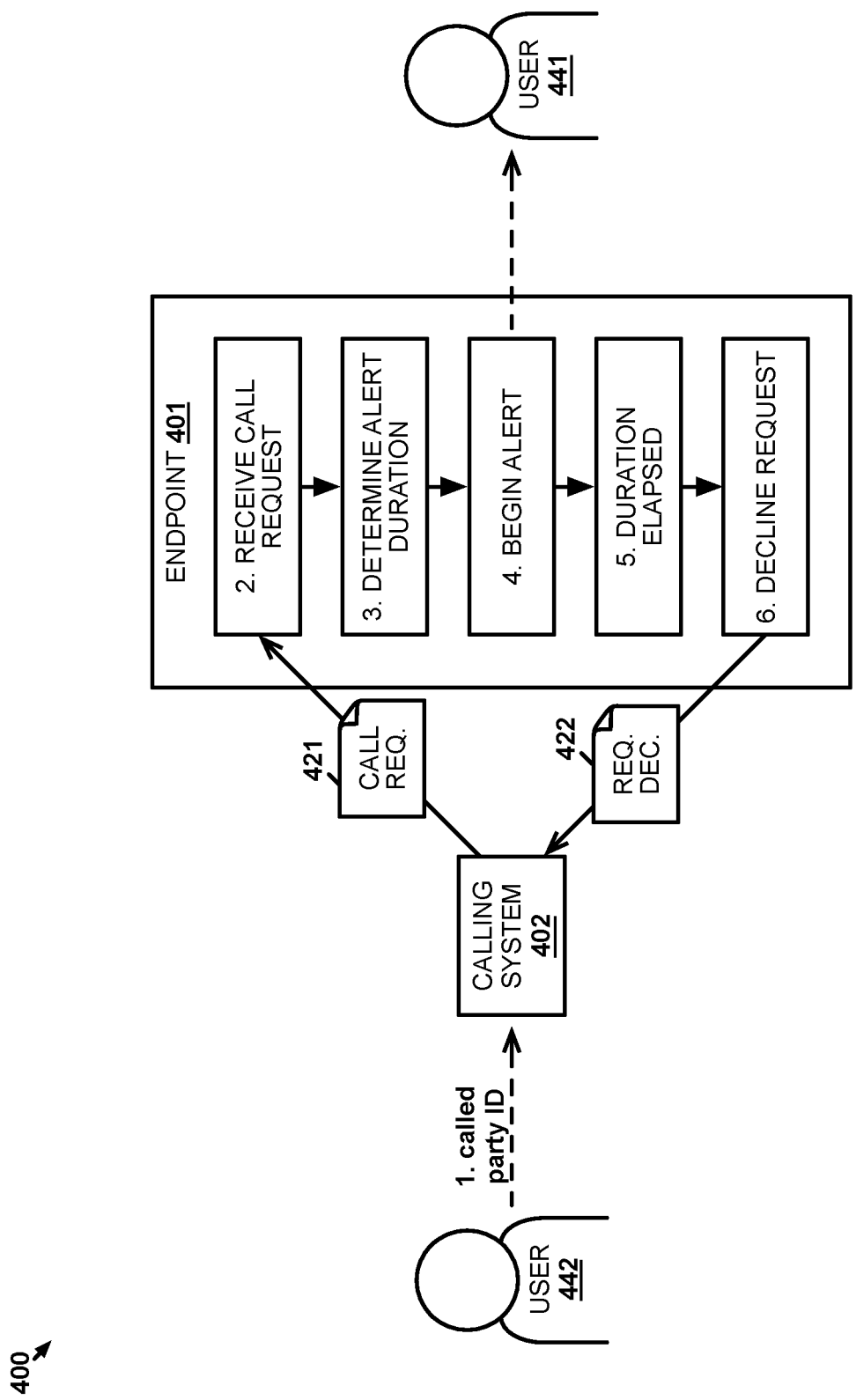
FIG. 4 illustrates another operational scenario to adaptively alert about a communication request.

FIG. 4 illustrates operational scenario 400 to adaptively alert about a communication request. In operational scenario 300, endpoint 401 is an example of endpoint 101 and calling system 402 is an example of calling system 102. Calling system 402 in this example is an endpoint operated by user 442 while endpoint 401 is operated by user 441. Operational scenario 400 describes a call being requested by user 442 in a manner similar to how user 342 requested the call in operational scenario 300. That is, user 442 provides a called party identifier for user 441 at step 1 to calling system 402 and calling system 402 responsively transfers call request 421 to endpoint 401, which receives call request 421 at step 2.

In response to receiving call request 421, endpoint 401 determines a duration in which endpoint 401 should alert user 441 about call request 421 at step 3. The duration may be determined based on information similar to that used by calling system 302 above. In this example, endpoint 401 may also use information about user 441's actual usage of endpoint 401. For instance, endpoint 401 may track when it was last operated by user 441, or when it is typically used by user 441, to predict whether user 441 will be within operating distance of endpoint 401. In a similar example, endpoint 401 may recognize whether user 441 typically answers calls at the time call request 421 was received. Of course, calling system 302 could have used similar information if available thereto.

Endpoint 401 begins alerting user 441 at step 4 and begins measuring the alert duration from when the alerting began. Upon the determined duration elapsing without receiving a response from user 441, endpoint 401 stops alerting user 441 and transfers request decline message 422 at step 6 to calling system 402. In some cases, request decline message 422 simply declines the call request. In other cases, request decline message 422 may direct calling system 402 to a voicemail system so that user 442 has the opportunity to leave user 441 a voicemail. In those cases, request decline message 422 may instead be sent to a service provider for endpoint 401 that includes the voicemail system.

The two examples of operational scenarios 300 and 400 above are examples between a call initiation system (e.g., calling systems 302, 402) and call endpoints (e.g., endpoints 301, 401), although, an intermediate system there between may also be configured do determine adaptive alert durations. For example, a system in a service provider for endpoint 301 may receive a call request from a calling system and determine a duration for the destination endpoint to alert its user. Upon the duration elapsing, the service provider system may cancel the call request to user 441 itself and notify the calling system of the cancellation or connect the calling system to voicemail.

Additionally, it is possible that multiple systems involved in the call request will use the adaptive alerting described above. The system that determines the shortest alert duration among the other determined alert durations would control when the alerting ends unless there is communication between the systems to determine which one controls. For example, a calling system may determine a duration of 15 seconds while a corresponding endpoint determines a duration of 10 seconds. If a user at the endpoint does not answer within 10 seconds, the endpoint will decline the call request even though the calling system would have allowed an extra 5 seconds.

Figure 5:
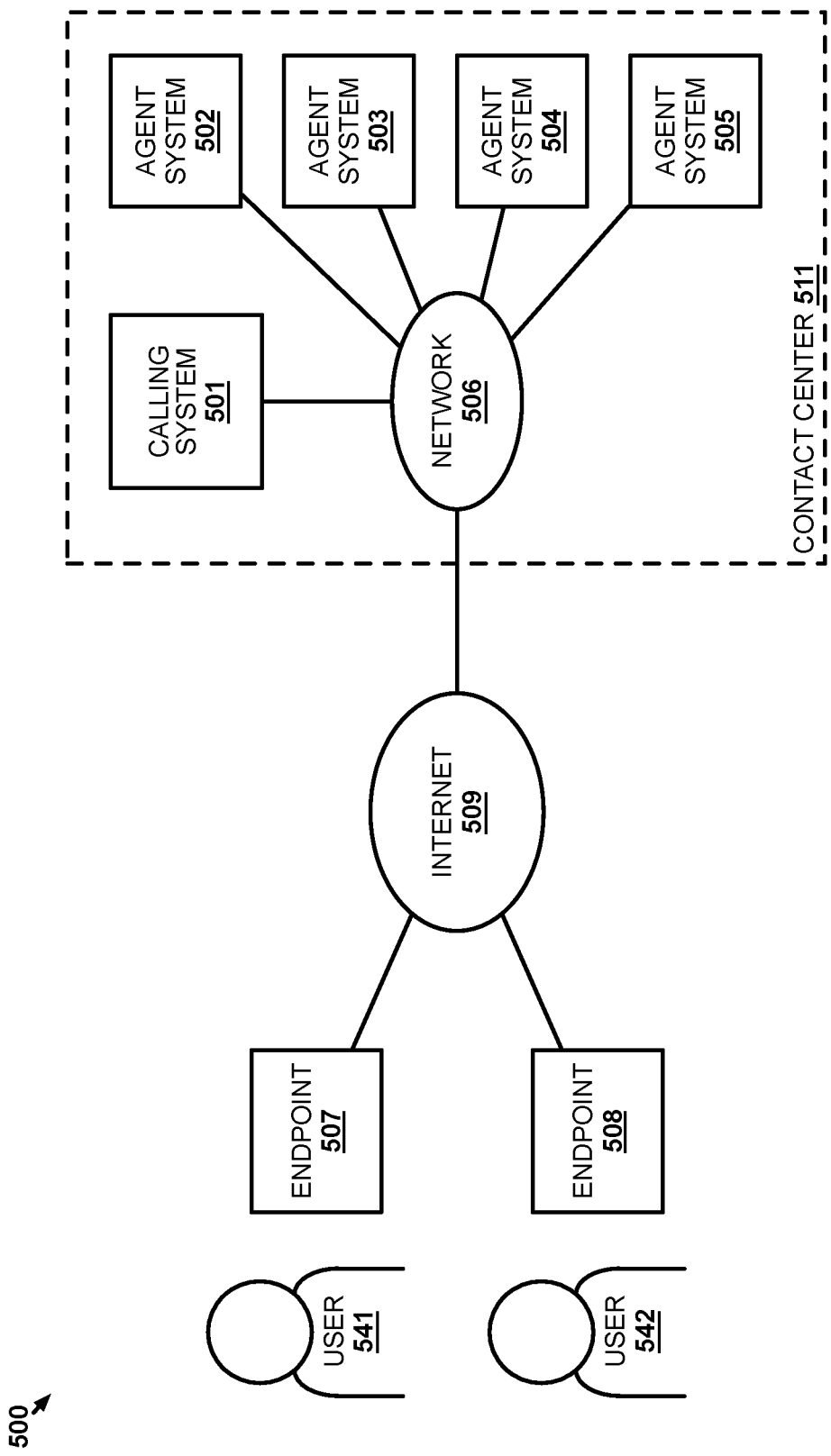
FIG. 5 illustrates another implementation for adaptively alerting about a communication request.

FIG. 5 illustrates implementation 500 for adaptively alerting about a communication request. Implementation 500 includes calling system 501, agent systems 502-505, communications network 506, endpoints 507-508, and Internet 509. Calling system 501, agent systems 502-505, and communications network 506 are part of contact center 511, which may be implemented in a single facility or dispersed among multiple facilities and geographic locations. While shown as a distinct network, communications network 506 may be implemented in part over Internet 509 to connection systems at multiple facilities. Though not shown, agent systems 502-505 are operated by respective agents of contact center 511.

In operation, calling system 501 selects called parties that should receive calls from contact center 511 and then, if a called user answers, connects the call to one of agent systems 502-505. Systems like calling system 501 are sometimes called automatic dialers. When an agent becomes available, a goal of calling system 501 is to connect that agent to a called party as soon as possible to ensure that the agent is not idling for too long, which adversely affects productivity of contact center 511. If calling system 501 waits longer than necessary for one called party to answer before dialing another called party, then the available agent may be idling for a correspondingly longer amount of time. Likewise, calling system 501 may want to give some called parties more time in which to answer if that party is likely to answer if given more time. The examples below describe how calling system 501 determines a duration for alerting a called party before moving on to dialing another called party.

Figure 6:
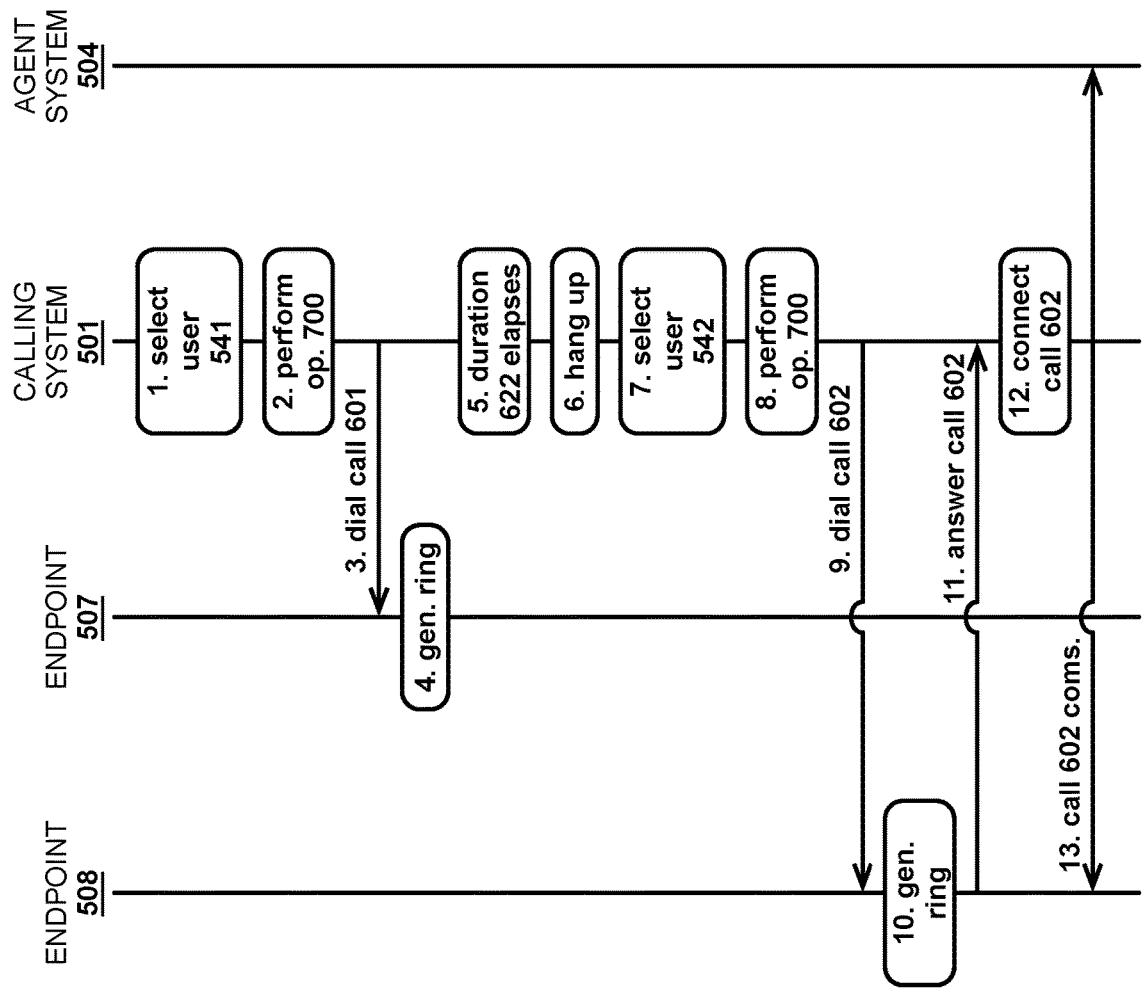
FIG. 6 illustrates an operational scenario to adaptively alert about a communication request.

FIG. 6 illustrates operational scenario 600 to adaptively alert about a communication request. At step 1, calling system 501 selects user 541 as a called party for a call with the agent operating agent systems 504. User 541 may be selected at random, selected from a predefined list, selected based on user 541 requesting a call from contact center 511, selected based on information indicating that user 541 may be interested in an offer for goods/services from contact center 511, or selected based on other reason that a call with an agent of a contact center would be desirable. In this example, called parties are dialed using a phone number. When selecting user 541, calling system 501 may select user 541 by selecting a phone number associated with user 541 directly or may select user 541 and then determine the phone number. Once user 541 is selected as the called party, calling system 501 performs in accordance with operational scenario 700 at step 2 to determine a duration in which calling system 501 should alert user 541 about call 601 before hanging up and moving on to dialing another called party.

Figure 7:
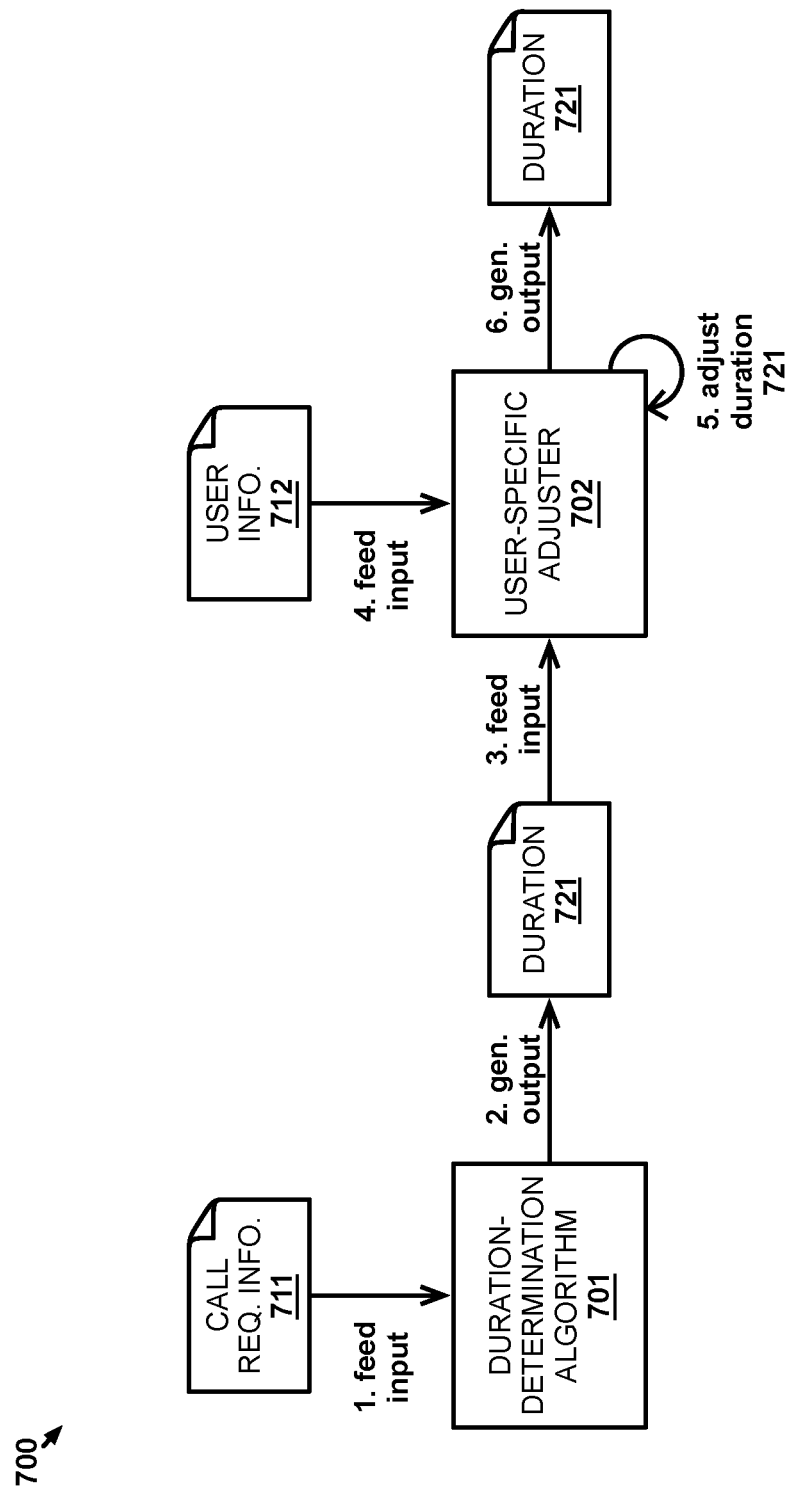
FIG. 7 illustrates an operational scenario to adaptively alert about a communication request.

FIG. 7 illustrates operational scenario 700 to adaptively alert about a communication request. Calling system 501 feeds call request information 711 at step 1 into duration-determination algorithm 701. Duration-determination algorithm 701 is a machine learning algorithm that was trained using call information from past calls. When duration-determination algorithm 701 was being trained, duration-determination algorithm 701 received information about past calls (to any called party) and the corresponding results of those past called (e.g., whether the call was answered, how long it took for the call to be answered, call was sent to voicemail, etc.). Call request information 711 includes information about call 601, such as information about user 541's age, gender, location, education level, profession, income level, etc., information about the device type for endpoint 507, the phone number used to identify calling system 501 to endpoint 507 on call 601, the current time at user 541's location, or any other type information that was also a type of information used to train duration-determination algorithm 701.

In response to being fed call request information 711, duration-determination algorithm 701 outputs duration 721 at step 2. Duration 721 represents an amount of time that duration-determination algorithm 701 has determined, based on its training, provides the best balance between not having calling system 501 to wait too long for an answer and allowing user 541 enough time to answer. In this example, duration 721 is then fed into user-specific adjuster 702 at step 3 along with user information 712 that is specific to contact center 511's experience with user 541 at step 4. User-specific adjuster 702 adjusts the value of duration 721 based on user information 712 at step 5. User information 712 is information that would not be accounted for in duration-determination algorithm 701. For example, user information 712 may indicate that user 541 is very important and should be given extra time to answer just to be safe. User-specific adjuster 702 may, therefore, adjust duration 721 to be longer than was output initially by duration-determination algorithm 701. Alternatively, user information 712 may indicate that user 541 has never answered a call from contact center 511 and, therefore, user-specific adjuster 702 adjusts duration 721 to be shorter than initially determined by duration-determination algorithm 701. The value for duration 721 that is output by user-specific adjuster 702 at step 6 is used by calling system 501 when calling user 541.

In operational scenario 700, a single duration-determination algorithm 701 is used by calling system 501. In other examples, multiple duration-determination algorithms may be used for calls with certain characteristics. For instance, a different duration-determination algorithm may be used for each called party age range. Each duration-determination algorithm in that example would be trained on past calls to called parties in the respective age ranges. When performing operational scenario 700 a duration-determination algorithm associated with an age range corresponding to user 541's age would then be used in place of duration-determination algorithm 701.

Referring back to operational scenario 600, calling system 501 dials call 601 at step 3 using the phone number associated with user 541. The phone number in this example directs call 601 to endpoint 507. Upon endpoint 507 receiving the incoming call request created by calling system 501 dialing call 601, endpoint 507 generates a series of ring tones at step 4 to notify user 541 about the incoming call. After dialing call 601, calling system 501 determines at step 5 that duration 622 has elapsed. Duration 622 is equivalent to duration 721 determined from operational scenario 700 in step 2 above. Duration 622 may be measured from when calling system 501 dialed call 601 or from when calling system 501 receives confirmation that the request for call 601 reached endpoint 507 (e.g., upon receiving a ring-back tone). Upon duration 622 elapsing, calling system 501 hangs up on call 601 at step 6. User 541 no longer has the ability to answer call 601 once calling system 501 hangs up on call 601. For example, duration 622 may be 12 seconds. Hence, calling system 501 dials call 601, waits 12 seconds, and then hangs up on call 601 since user 541 did not answer (and calling system 501 did not receive a corresponding answer response from endpoint 507).

After hanging up on call 601, calling system 501 can repurpose the resources previously designated for establishing call 601 to establishing another call, call 602 in this case, with another called party. In particular, calling system 501 selects user 542 for call 602 at step 7 in a manner similar to how user 541 was selected in step 1. Once user 542 is selected as the called party, calling system 501 performs in accordance with operational scenario 700 at step 8 to determine a duration in which calling system 501 should alert user 542 about call 602 before hanging up and moving on to dialing another called party. Operational scenario 700 is performed similarly to that described above for call 601 but call request information 711 is information about call 602 and user information 712 is information specific to user 542. As such, given the different information used as input into duration-determination algorithm 701 and user-specific adjuster 702, duration 721 generated in step 8 is likely different than duration 721 generated when operational scenario 700 occurred in step 2 (although could be the same).

Calling system 501 dials call 602 at step 9 using a phone number associated with user 542. The phone number in this case directs call 602 to endpoint 508. Upon endpoint 508 receiving the incoming call request created by calling system 501 dialing call 602, endpoint 508 generates a series of ring tones at step 10 to notify user 542 about the incoming call. Unlike user 541 above, user 542 answers call 602 using endpoint 508, which indicates to calling system 501 at step 11 that call 602 has been answered, before the duration determined by operational scenario 700 at step 8 has elapsed. In response to call 602 being answered, calling system 501 connects call 602 at step 12 to agent system 504 being operated by an available agent. User communications (e.g., voice communications) between user 542 and the agent operating agent system 504 are then exchanged at step 13 between endpoint 508 and agent system 504.

Advantageously, calling system 501 was able to use duration 622 determined in operational scenario 700 to end call 601 and move onto call 602 without waiting a duration that was otherwise unrelated to the particular circumstances of call 601. Duration 622 balanced a goal of calling system 501 to provide user 541 with time to answer call 601 with a goal to minimize the amount of time that the agent operating agent system 504 is not on a call.

In some examples, the information about call 601 and an indication that call 601 was not answered may be used to further train duration-determination algorithm 701 and/or update user information 712 for user 541. Likewise, the information about call 602 and an indication that call 602 was answered may be used further train duration-determination algorithm 701 and/or update user information 712 for user 542.

Figure 8:
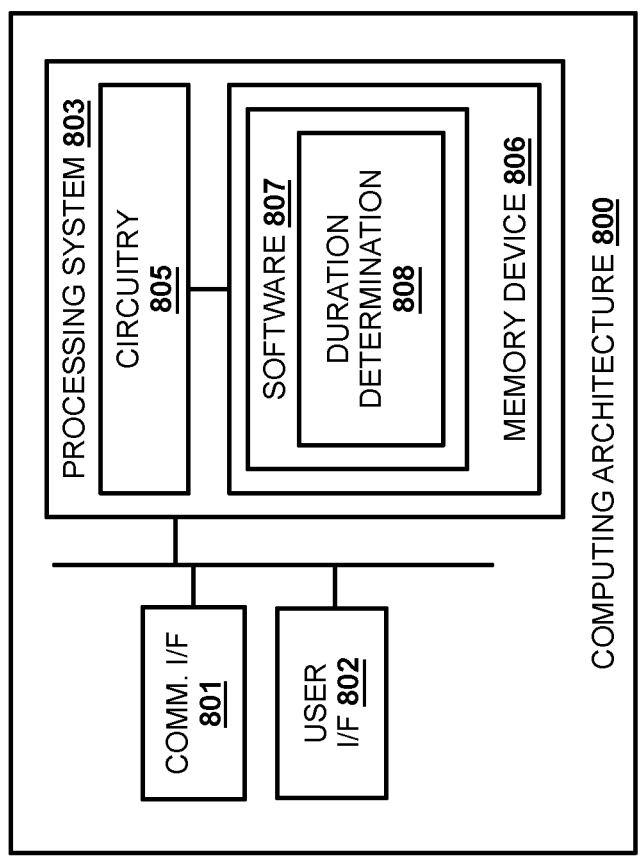
FIG. 8 illustrates a computing architecture for adaptively alerting about a communication request.

FIG. 8 illustrates computing architecture 800 for adaptively alerting about a communication request. Computing architecture 800 is an example computing architecture for meeting calling systems 102, 302, 402, 501, endpoints 101, 301, 401, 507, 508, and agent systems 502-505, although those systems may use alternative configurations. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes duration-determination module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, duration-determination module 808 directs processing system 803 to identify a first request to establish a first communication session with a first endpoint and determine a first duration for alerting a first user of the first endpoint about the first request based on information about the first request. Duration-determination module 808 further directs processing system 803 to alert the first user about the first request in accordance with the first duration.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for adaptive communication alerts, the method comprising:
  selecting a first user for receiving a first call request to establish a first communication session between a first endpoint operated by the first user and an agent endpoint operated by one of a plurality of agents of a contact center;
  determining a first duration for alerting the first user about the first call request based on information about the first call request, wherein the information indicates at least one of a likelihood that the first user will respond to the first call request and how long it will likely take for the first user to respond to the first call request;
initiating the first call request to a first endpoint operated by the first user, wherein the first endpoint alerts the first user about the first call request; and
upon the first duration elapsing without a response to the first call request from the first endpoint, canceling the first call request.

2. The method of claim 1, wherein canceling the first call request comprises:
hanging up on the first call request.

3. The method of claim 1, wherein determining the first duration comprises:
feeding at least a portion of the information about the first call request into a duration-determination algorithm comprising a machine learning algorithm trained using information about past requests to establish communication sessions and respective outcomes of the past requests.

4. The method of claim 3, further comprising:
training the duration-determination algorithm based on the cancelation of the first call request.

5. The method of claim 3, wherein determining the first duration further comprises:
adjusting a value for the first duration that is output by the duration-determination algorithm based on a second portion of the information about the first call request that is associated with the first user.

6. The method of claim 5, further comprising:
updating the second portion of the information based on cancelation of the first call request.

7. The method of claim 1, wherein determining the first duration comprises:
assigning a value to the first duration that inversely relates to a likelihood that the first user will respond to the first call request.

8. The method of claim 1, wherein the information about the first call request includes one or more of a group comprising:
called-party information about the first user;
calling-system information;
a first time at which the first call request is identified;
one or more past durations for alerting the first user about requests to establish communication sessions;
a device type of the first endpoint; and
status information about the first user from one or more third-party channels.

9. The method of claim 1, wherein the first duration comprises either an amount of time or a number of discrete alert events.

10. The method of claim 1, further comprising:
identifying a second call request to establish a second communication session with a second endpoint;
determining a second duration for alerting a second user of the second endpoint about the second call request based on information about the second call request, wherein the second duration is different than the first duration; and
alerting the second user about the second call request in accordance with the second duration.

11. An apparatus for adaptive communication alerts, the apparatus comprising:
one or more computer readable storage media;
a processing system operatively coupled with the one or more computer readable storage media; and
program instructions stored on the one or more computer readable storage media that, when read and executed by the processing system, direct the processing system to:
select a first user for receiving a first call request to establish a first communication session between a first endpoint operated by the first user and an agent endpoint operated by one of a plurality of agents of a contact center;
determine a first duration for alerting the first user about the first call request based on information about the first call request, wherein the information indicates at least one of a likelihood that the first user will respond to the first call request and how long it will likely take for the first user to respond to the first call request;
initiate the first call request to a first endpoint operated by the first user, wherein the first endpoint alerts the first user about the first call request; and
upon the first duration elapsing without a response to the first call request from the first endpoint, cancel the first call request.

12. The apparatus of claim 11, wherein to cancel the first call request, the program instructions direct the processing system to:
hang up on the first call request.

13. The apparatus of claim 11, wherein to determine the first duration, the program instructions direct the processing system to:
feed at least a portion of the information about the first call request into a duration-determination algorithm comprising a machine learning algorithm trained using information about past requests to establish communication sessions and respective outcomes of the past requests.

14. The apparatus of claim 13, wherein the program instructions further direct the processing system to:
train the duration-determination algorithm based on the cancelation of the first call request.

15. The apparatus of claim 13, wherein to determine the first duration further, the program instructions direct the processing system to:
adjust a value for the first duration that is output by the duration-determination algorithm based on a second portion of the information about the first call request that is associated with the first user.

16. The apparatus of claim 15, wherein the program instructions further direct the processing system to:
update the second portion of the information based on cancelation of the first call request.

17. The apparatus of claim 11, wherein to determine the first duration, the program instructions direct the processing system to:
assign a value to the first duration that inversely relates to a likelihood that the first user will respond to the first call request.

18. The apparatus of claim 11, wherein the information about the first call request includes one or more of a group comprising:
called-party information about the first user;
calling-system information;
a first time at which the first call request is identified;
one or more past durations for alerting the first user about requests to establish communication sessions;
a device type of the first endpoint; and
status information about the first user from one or more third-party channels.

19. The apparatus of claim 11, wherein the first duration comprises either an amount of time or a number of discrete alert events.

20. One or more non-transitory computer readable storage media having program instructions store thereon for adaptive communication alerts, the program instructions, when read and executed by a processing system, direct the processing system to:
- select a first user for receiving a first call request to establish a first communication session between a first endpoint operated by the first user and an agent endpoint operated by one of a plurality of agents of a contact center;
- determine a first duration for alerting the first user about the first call request based on information about the first call request, wherein the information indicates at least one of a likelihood that the first user will respond to the first call request and how long it will likely take for the first user to respond to the first call request;
- initiate the first call request to a first endpoint operated by the first user, wherein the first endpoint alerts the first user about the first call request; and
- upon the first duration elapsing without a response to the first call request from the first endpoint, cancel the first call request.

* * * * *